United States Patent Office 3,008,921
Patented Nov. 14, 1961

3,008,921
DIENE RUBBER WITH A PARA-BETA CYANOALKYLAMINODIPHENYLAMINE ANTIOZONANT
Richard H. Kline, Stow, Ohio, assignor to The Goodyear Tire & Rubber Company, Akron, Ohio, a corporation of Ohio
No Drawing. Filed Mar. 28, 1958, Ser. No. 724,525
5 Claims. (Cl. 260—45.9)

This invention relates to the preservation of oxidizable compositions such as rubber and petroleum products and, more particularly, to the provision and use of a new class of para-beta-cyanoalkylaminodiphenylamines which are useful as age resistors for the various oxidizable rubbers and gasoline.

It is an object of the present invention to provide antioxidant and antiozonant compositions which are capable of protecting various oxidizable rubbers and petroleum products for extended periods of time. It is another object of this invention to provide para-beta-cyanoalkylaminodiphenylamines which are capable of protecting various oxidizable rubbers and petroleum products from deterioration from oxygen, ozone, and/or sunlight.

In the practice of this invention, oxidizable compositions are protected from deterioration by means of para-beta-cyanoalkylaminodiphenylamines. The para-beta-cyanoalkylaminodiphenylamines of this invention can be further described as para-beta-cyanoalkylaminodiphenylamines conforming to the following structure:

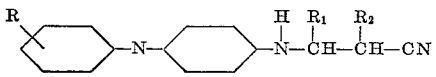

wherein R is selected from H, alkoxy radicals having from 1 to 9 carbon atoms, aliphatic alkyl radicals having from 1 to 9 carbon atoms and aralkyl radicals having from 7 to 10 carbon atoms, and wherein $R_1$ and $R_2$ may be hydrogen or the same or different radicals selected from the group consisting of alkyl radicals having from 1 to 4 carbon atoms and phenyl radicals having from 6 to 9 carbon atoms.

Representative para - beta - cyanoalkylaminodiphenylamines which are useful in the practice of this invention are compounds having the phenyl rings unsubstituted such as para-beta-cyanoethylaminodiphenylamine, alpha-methyl - beta - cyanoethylaminodiphenylamine, alpha-phenylbeta-cyanoethylaminodiphenylamine, beta-methyl-beta-cyanoethylaminodiphenylamine, etc. Substituted para-beta-cyanoalkylaminodiphenylamines which are useful in the practice of this invention are:

4-beta-cyanoethylamino-4'-methyldiphenylamine
4-beta-cyanoethylamino-2'-methyldiphenylamine
4-beta-cyanoethylamino-4'-methoxydiphenylamine
4-beta-cyanoethylamino-2'-methoxydiphenylamine
4-beta-cyanoethylamino-4'-ethyldiphenylamine
4-beta-cyanoethylamino-4'-ethoxydiphenylamine
4-beta-cyanoethylamino-4'-butyldiphenylamine
4-beta-cyanoethylamino-4'-octyldiphenylamine
4(alpha-methyl-beta - cyanoethylamino) - 4' - methyldiphenylamine
4(alpha-methyl - beta-cyanoethylamino) - 2' - methyldiphenylamine
4(alpha-methyl-beta-cyanoethylamino) - 4' - methoxydiphenylamine
4(alpha-methyl-beta-cyanoethylamino) - 2' - methoxydiphenylamine
4(alpha-phenyl-beta - cyanoethylamino) - 4' - methyldiphenylamine
4(alpha-phenyl-beta - cyanoethylamino) - 4' - methoxydiphenylamine The para-beta-cyanoalkylaminodiphenylamines of this invention may be made by reacting a para-aminodiphenylamine with an unsaturated aliphatic nitrile. For best results, the reaction is carried out in the presence of an acidic catalyst such as acetic acid, oxalic acid, formic acid, chloroacetic acid, sulfuric acid, copper salts, and ammonia or amine salts of strong acids.

The para-aminodiphenylamines which can be used in the practice of this invention are:

4-aminodiphenylamine
4-amino-4'-methyldiphenylamine
4-amino-2'-methyldiphenylamine
4-amino-4'-methoxydiphenylamine
4-amino-2'-methoxydiphenylamine
4-amino-4'-ethyldiphenylamine
4-amino-4'-ethoxydiphenylamine
4-amino-4'-butyldiphenylamine
4-amino-4'-octyldiphenylamine The alpha,beta unsaturated aliphatic nitriles which can be used in the practice of this invention are:

Acrylonitrile
Crotonitrile
Cinnamonitrile
Alpha-methylacrylonitrile

Although the temperature of reaction is not critical, it is preferred to complete the reactions of this invention within a temperature range of about 50° C. to 200° C. For best results, a temperature ranging from about 75° C. to 150° C. is preferred.

The invention may be further illustrated by means of the following examples which are not intended as limitations on the scope of the invention.

EXAMPLE 1

One hundred eighty-four grams of para-aminodiphenylamine, 58 grams of acrylonitrile and 20 grams of glacial acetic acid were heated together at reflux temperatures for 5 hours during which time the temperature rose from 95 to 133° C. The mixture was cooled and the deposited solids were ground up and washed twice with ethyl alcohol. After drying, the product weighed 183.5 grams, which was a 78% yield, and had a melting point of 144–6° C. The product was para-beta-cyanoethylaminodiphenylamine.

The compounds of this invention were tested as antioxidants in the following standard rubber formulation:

| | |
|---|---:|
| Extracted pale crepe | 100.0 |
| Zinc oxide | 5.0 |
| Sulfur | 3.0 |
| Hexamethylenetetramine | 1.0 |
| Stearic acid | 1.5 |
| Antioxidant | 1.0 |

The stocks were cured for 50 minutes at 285° F. The antioxidant efficiency was measured by aging the samples for 7 hours in an oxygen bomb at a temperature of 50° C. under a pressure of 150 pounds per square inch. The percent tensile retention and weight increase were used as measures of efficiency as shown in the following table:

*7 hr. air bomb aging—Natural rubber tread stock—1% antioxidant*

| | Original Flex | Aged Flex Final | Percent Tensile Retention |
|---|---:|---:|---:|
| Control—No antioxidant | 100 | 100 | 100 |
| Phenyl-beta-naphthylamine | 144 | 178 | 132 |
| Para-beta-cyanoethylamino-diphenylamine | 105 | 262 | 221 |

The antiozonant properties of the compounds of this invention were tested in a butadiene-styrene tread stock according to the following formulation:

| | |
|---|---|
| GRS 1500 | 100.0 |
| Carbon black | 50.0 |
| Processing oil | 7.0 |
| N-cyclohexyl-2-benzothiazole sulfenamide | 1.25 |
| Sulfur | 2.0 |
| Zinc oxide | 6.0 |
| Wax | 1.5 |
| Antiozonant | 4.0 |

The test samples were cured for 90 minutes at 285° F. temperature and aged for 24 hours after which they were exposed to 50 p.p.h.m. $O_3$.

*Ozone resistance—GRS tread stock—4% antiozonant*

[Exposed to 50 p.p.h.m. $O_3$; aged 24 hrs. before exposure]

| Compound | Time to first crack | |
|---|---|---|
| | Aged at 100° F., min. | Aged at 100° C., min. |
| Control (No antioxidant) | 23 | 41 |
| Para-beta-cyanoethylaminodiphenylamine | 42 | 275 |

The above materials showed good ozone resistance when compared with a control when immersed for 15 minutes in 10,000 p.p.h.m. of ozone.

Although this invention has been described with reference to pure compounds, mixtures of the several materials claimed herein can be used in the practice of the invention.

The rubbers which can be protected by the products of this invention are the oxidizable rubbery polymers of conjugated dienes which include natural rubber and the various synthetic diene rubbers which are similar to natural rubber in their aging characteristics, such as polychloroprene; butyl rubber, which is a polymerization product of a major proportion of a mono olefin, such as isobutylene, and a minor proportion of a multi olefin, such as butadiene or isoprene; the rubbery copolymers of butadiene and styrene which may contain from 50 to 75% by weight of butadiene; the rubbery copolymers of butadiene and acrylonitrile and polyisoprene.

The products of the invention are useful as age resistors for raw rubbers in latex form, coagulated rubber latices or vulcanized rubbers, and may be present in an amount of from 0.25 to 5.0% by weight, based on the weight of the rubber, although it is generally preferred to use from 0.5 to 2.0% by weight, based on the weight of rubber.

The antioxidants of this invention can be incorporated into rubber in any customary manner. They may be added in the form of physical mixtures or in the form of emulsions using any of the known emulsifiers such as monovalent metal hydroxides, fatty acids, organic soaps, etc. They may be added to the rubber in the form of latex, or they may be milled into coagulated rubber in the usual manner.

The various highly refined hydrocarbons which can be protected by the products of this invention can be described as catalytically cracked, thermally cracked gasoline or blends thereof. Higher boiling fractions such as kerosene, fuel oil, and diesel oils are also included within the scope of this invention.

The compounds of this invention can be used to stabilize the highly refined hydrocarbons by adding about .001% to 0.1% by weight of the antioxidant to the highly refined hydrocarbons.

While certain representative embodiments and details have been shown for the purpose of illustrating the invention, it will be apparent to those skilled in this art that various changes and modifications may be made therein without departing from the spirit or scope of the invention.

I claim:
1. An oxidizable diene rubber containing as an antiozonant in an antiozonant amount, a para-beta-cyanoalkylaminodiphenylamine conforming to the following structure:

wherein R is selected from hydrogen, alkoxy radicals having from 1 to 9 carbon atoms, alkyl radicals having from 1 to 9 carbon atoms and aralkyl radicals having from 7 to 10 carbon atoms and wherein $R_1$ and $R_2$ are selected from hydrogen, alkyl radicals having from 1 to 4 carbon atoms and phenyl radicals having from 6 to 9 carbon atoms.

2. An oxidizable diene rubber containing as an antiozonant is an antiozonant amount, para-beta-cyanoethylaminodiphenylamine.

3. An oxidizable diene rubber in accordance with claim 1 wherein the para-beta-cyanoalkylaminodiphenylamine is 4-beta-cyanoethylamino-4'-methyldiphenylamine.

4. An oxidizable diene rubber in accordance with claim 1 wherein the para-beta-cyanoalkylaminodiphenylamine is 4-beta-cyanoethylamino-4'-methoxydiphenylamine.

5. An oxidizable diene rubber in accordance with claim 1 wherein the para-beta-cyanoalkylaminodiphenylamine is 4(alpha-methyl-beta-cyanoethylamino)-4'-methyldiphenylamine.

References Cited in the file of this patent

UNITED STATES PATENTS

| | | |
|---|---|---|
| 1,725,564 | Calcott et al. | Aug. 20, 1929 |
| 1,835,140 | Calcott et al. | Dec. 8, 1931 |
| 2,038,631 | Bennett et al. | Apr. 28, 1936 |
| 2,449,006 | Parker et al. | Sept. 7, 1948 |
| 2,498,630 | Thompson | Feb. 28, 1950 |
| 2,555,127 | Gunther | May 29, 1951 |
| 2,714,614 | Weinmayr | Aug. 2, 1955 |
| 2,734,808 | Biswell | Feb. 14, 1956 |
| 2,735,834 | Stanton et al. | Feb. 21, 1956 |
| 2,802,810 | Bill | Aug. 13, 1957 |

UNITED STATES PATENT OFFICE
CERTIFICATE OF CORRECTION

Patent No. 3,008,921                           November 14, 1961

Richard H. Kline

It is hereby certified that error appears in the above numbered patent requiring correction and that the said Letters Patent should read as corrected below.

Column 3, line 49, for "mount" read -- amount --; column 4, line 34, for "is" read -- in --.

Signed and sealed this 5th day of June 1962.

(SEAL)
Attest:

ERNEST W. SWIDER                               DAVID L. LADD
Attesting Officer                                  Commissioner of Patents